(12) United States Patent
Tsunoda

(10) Patent No.: US 10,190,016 B2
(45) Date of Patent: Jan. 29, 2019

(54) TWO-COMPONENT PAINT COMPOSITION AND MULTILAYER COATING FORMATION METHOD USING THIS

(71) Applicant: BASF Coatings GmbH, Muenster (DE)

(72) Inventor: Takeshi Tsunoda, Yokohama (JP)

(73) Assignee: BASF Coatings GmbH, Muenster (DE)

( * ) Notice: Subject to any disclaimer, the term of this patent is extended or adjusted under 35 U.S.C. 154(b) by 138 days.

(21) Appl. No.: 15/324,227

(22) PCT Filed: Jun. 3, 2015

(86) PCT No.: PCT/EP2015/062418
§ 371 (c)(1),
(2) Date: Jan. 5, 2017

(87) PCT Pub. No.: WO2016/005115
PCT Pub. Date: Jan. 14, 2016

(65) Prior Publication Data
US 2017/0198162 A1  Jul. 13, 2017

(30) Foreign Application Priority Data
Jul. 8, 2014 (JP) .................................. 2014-140928

(51) Int. Cl.
| | | |
|---|---|---|
| C09D 133/06 | (2006.01) | |
| C09D 143/04 | (2006.01) | |
| C09D 4/06 | (2006.01) | |
| C08F 220/20 | (2006.01) | |
| C09D 183/10 | (2006.01) | |
| C09D 183/00 | (2006.01) | |
| C09D 7/63 | (2018.01) | |
| B05D 7/00 | (2006.01) | |
| C08J 3/24 | (2006.01) | |
| C08G 77/442 | (2006.01) | |
| C08K 5/3435 | (2006.01) | |
| C08K 5/3475 | (2006.01) | |

(52) U.S. Cl.
CPC ......... *C09D 133/066* (2013.01); *B05D 7/532* (2013.01); *B05D 7/56* (2013.01); *C08F 220/20* (2013.01); *C09D 4/06* (2013.01); *C09D 7/63* (2018.01); *C09D 143/04* (2013.01); *C09D 183/00* (2013.01); *C09D 183/10* (2013.01); *C08G 77/442* (2013.01); *C08J 3/241* (2013.01); *C08J 3/243* (2013.01); *C08K 5/3435* (2013.01); *C08K 5/3475* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,399,607 A | * | 3/1995 | Nanbu ................. | C08L 33/066 524/379 |
| 2002/0016418 A1 | * | 2/2002 | Maruyama ............ | C08F 230/08 525/326.6 |
| 2002/0068176 A1 | * | 6/2002 | Yokoyama ........... | C09D 5/4407 428/423.1 |
| 2005/0065271 A1 | * | 3/2005 | Graham ............. | C08G 18/6295 524/523 |
| 2013/0136865 A1 | * | 5/2013 | Groenewolt ........... | C08G 18/10 427/387 |

(Continued)

FOREIGN PATENT DOCUMENTS

| | | | | |
|---|---|---|---|---|
| GB | 2479075 A | * | 9/2011 | ............. C08G 18/44 |
| GB | 2479075 A | | 9/2011 | |

(Continued)

OTHER PUBLICATIONS

International Search Report dated Jul. 20, 2015 in PCT/EP15/062418 Filed Jun. 3, 2015.

*Primary Examiner* — Marc S Zimmer
(74) *Attorney, Agent, or Firm* — Oblon, McClelland, Maier & Neustadt, L.L.P.

(57) ABSTRACT

[Purpose] Among two-component top coat paints for the automobile coatings field, wherein the base resin paint is circulated from a main tank with a pump upstream of the coating gun, and mixing and coating are effected using a curing agent supplied from a nitrogen-sealed tank and a two-component mixing device, to provide a paint composition with which problems such as thickening and gelling of the circulating base resin paint do not occur, coating is possible with a stabilized constant coating viscosity, and with which the paint film after stoving exhibits excellent Scratch resistance, stain resistance, acid resistance and gasoline resistance, and a multilayer coating formation method using this. [Solution] The present invention provides a two-component paint composition which is applied directly after mixing a base resin and a curing agent, wherein the base resin (A) contains a hydroxy group-containing acrylic resin (A-1) and a curing catalyst (A-2) as essential components, the curing agent (B) contains an isocyanate Compound (B-1) and an alkoxysilyl group-containing copolymer (B-2) as essential components, the aforesaid hydroxy group-containing acrylic resin (A-1) has a hydroxyl value of 80 to 180 mg KOH/g, a glass transition temperature of −40 to 40° C., and a weight average molecular weight of 2,000 to 20,000 g/mol, the aforesaid alkoxysilyl group-containing copolymer (B-2) is a copolymer obtained by copolymerizing 30 to 80 parts by weight of a vinylic monomer containing alkoxysilyl groups and 20 to 70 parts by weight of other copolymerizable monomers, its weight average molecular weight is 2,000 to 20,000 g/mol, and it does not contain hydroxy groups, carboxyl groups or amino groups which react with isocyanate groups.

6 Claims, No Drawings

(56) References Cited

U.S. PATENT DOCUMENTS

2014/0037851 A1* 2/2014 Groenewolt ....... C08G 18/0823
427/372.2

FOREIGN PATENT DOCUMENTS

| JP | 1-141952 A | 6/1989 | | |
|---|---|---|---|---|
| JP | 2001-261918 A | 9/2001 | | |
| JP | 2006-176633 A | 7/2006 | | |
| JP | 4943572 B2 | 5/2012 | | |
| JP | 2013-525528 A | 6/2013 | | |
| WO | 2009/024351 A1 | 2/2009 | | |
| WO | WO-2009024351 A1 * | 2/2009 | ......... | C09D 133/066 |

* cited by examiner

TWO-COMPONENT PAINT COMPOSITION AND MULTILAYER COATING FORMATION METHOD USING THIS

TECHNOLOGICAL FIELD

The present invention relates to a curable resin composition for top coat paints and a multilayer coating formation method using this. More specifically, among two-component top coat paints for the automobile coatings field, wherein the base resin paint is circulated from a main tank with a pump upstream of the coating gun, and mixing and coating are effected using a curing agent supplied from a nitrogen-sealed tank and a two-component mixing device, it relates to a two-component paint composition with which excellent scratch resistance, stain resistance, acid resistance and gasoline resistance are obtained, and a multilayer coating formation method using this.

PRIOR ART

Recently, with automobile coatings, scratching due to car-washes and the like, scratching by nails when doors are opened and closed, and the like, have been identified as problems, and there is a demand for coatings with superior scratch resistance. Also, there is high demand for easy maintenance coatings with which dirt adhering during journeys, rain streak stains due to adhered atmospheric dirt and the like are easily removed.

For example, as curable resin compositions with excellent scratch resistance, curable resin compositions characterized in that they are curable resin compositions which contain both a hydroxy group-containing acrylic resin and a polyfunctional isocyanate compound, wherein at least some of the aforesaid polyfunctional isocyanate compound is an isocyanurate type isocyanate compound, and the aforesaid curable resin composition has 25 to 50 mass % of soft segment regions represented by the following general formula (1):

(1)

(in the formula, n means a whole number 4 or greater), relative to the total solids fraction mass of the aforesaid hydroxy group-containing resin and polyfunctional isocyanate compound, are known (Patent reference 1). However, with these curable resin compositions, although the carwash scratch resistance is improved, there were problems in that adhered dirt was difficult to remove since the paint film obtained was soft, gasoline resistance was poor, and the polishing process time for repairing paint films to which dirt and the like had adhered in the coating line was longer. "Polishing process time" means the total time for the process of removing dirt and the like adhered in the coating line by sanding and the process of eliminating sanding marks with a finishing material, and if this time becomes longer it causes a problem in that the productivity falls.

Further, as heat-curable compositions with superior stain resistance, heat-curable compositions having as the main component compositions comprising a resin (A) having hydroxy groups, an alkoxysilane group-containing copolymer (B) and a curing catalyst (C) are known (Patent reference 2). However, with these heat-curable compositions, although the stain resistance is improved, there were problems in that because no isocyanate compounds were incorporated the paint films obtained had little flexibility, and the impact resistance, bending resistance and scratch resistance were poor.

Further, as two-component heat-curable compositions with excellent stain resistance, curable resin compositions for top coat paints made by incorporating, into a base resin composition containing 100 parts by weight of a resin (A) having as an essential component a vinylic copolymer (A-1) containing silyl groups bound to hydrolyzable groups and hydroxy groups and 50 to 400 parts by weight of an aliphatic hydrocarbon-containing organic solvent (C) wherein the aromatic group-containing component is 50 wt. % or less, a curing agent composition containing 0.1 to 100 parts by weight of a polyfunctional isocyanate compound (D) soluble in the previously admixed component (C), 0.01 to 30 parts by weight of an organometallic compound (E) and 0.1 to 100 parts by weight of a monofunctional isocyanate compound (F) are known (Patent reference 3). With these heat-curable compositions, although the weather resistance and stain resistance are improved, because a resin having as an essential component a vinylic copolymer containing silyl groups bound to hydrolyzable groups is used as the base resin paint, there were problems in that when the base resin paint is circulated from a main tank with a pump upstream of the coating gun, and applied, the hydrolyzable silyl groups are hydrolyzed and condensed by moisture in the air and the like, and it thickens and gels. These paint compositions are curable resin compositions for top coat paints which is suitable for use for example in coatings in buildings, household electrical appliances, industrial equipment and the like made up of metals, ceramics, glass, cement, fired moldings, plastic, wood, paper, fabrics and the like, and were not compositions considered for the two-component coating method in the automotive field wherein mixing and coating are effected using a curing agent supplied from a nitrogen-sealed tank and a two-component mixing device wherein the base resin paint is circulated from a main tank with a pump upstream of the coating gun. Also, the excellent scratch resistance demanded in the automobile coatings field could not be obtained.

PRIOR ART REFERENCES

Patent References

[Patent reference 1]
Japanese Laid-Open Specification 2006-176633
[Patent reference 2]
Japanese Laid-Open Specification 01-141952
[Patent reference 3]
Japanese Patent No. 4943572

OUTLINE OF INVENTION

Problem to be Solved by Invention

The problem to be solved by the present invention is, among two-component top coat paints for the automobile coatings field, wherein the base resin paint is circulated from a main tank with a pump upstream of the coating gun, and mixing and coating are effected using a curing agent supplied from a nitrogen-sealed tank and a two-component mixing device, to provide a paint composition with which problems such as thickening and gelling of the circulating base resin paint do not occur, coating is possible with a stabilized constant coating viscosity, and with which the paint film after stoving exhibits excellent scratch resistance, stain resistance, acid resistance and gasoline resistance, and a multilayer coating formation method using this.

Means of Solving Problem

The present inventors, in order to make a paint composition with which the paint film after stoving exhibits excellent scratch resistance, stain resistance, acid resistance and gasoline resistance, considered and studied whether this might be feasible by increasing the crosslinking density of the paint film by introducing alkoxysilyl groups into a two-component acrylic-urethane paint composition.

Specifically, they studied combining a base resin paint having as its main component a resin composition made by copolymerizing a hydroxy group-containing vinylic monomer, an alkoxysilyl group-containing monomer, acrylic acid and/or methacrylic acid and other copolymerizable monomers, and a curing agent having as its main component an isocyanate compound. However, there were problems with this paint composition since the base resin thickened in circulation tests simulating a paint line. Although the thickening was decreased by adding a dehydrating agent to the base resin composition, this was not sufficient.

Accordingly, they studied incorporating an alkoxysilyl group-containing copolymer which undergoes hydrolysis and condensation reactions due for example to moisture in the air into a curing agent fed into the two-component mixing device from a tank sealed with nitrogen so that it does not come into contact with moisture. Since the alkoxysilyl group-containing copolymer is mixed with an isocyanate compound, it has to be a copolymer not containing hydroxy groups, carboxyl groups or amino groups which react with isocyanates. Further, by optimizing the alkoxysilyl group-containing copolymer, it was adjusted so as to increase compatibility with isocyanate compounds and such that the paint films obtained by means of these paint compositions displayed excellent scratch resistance, stain resistance, acid resistance and gasoline resistance. As a result of this, they discovered that because the alkoxysilyl group-containing copolymer is introduced into a nitrogen-sealed tank, thickening due to hydrolysis by contact with moisture and condensation does not occur, and stability during storage and during application improves dramatically. Further, even in cases where moisture was mixed in, for example at the time when the curing agent composition was refilled into the tank, since the lower molecular weight isocyanate compound reacts with moisture before the alkoxysilyl group-containing copolymer, thickening is kept very low.

In other words, the present invention provides a two-component paint composition which is applied directly after mixing the base resin and the curing agent, wherein the base resin (A) contains a hydroxy group-containing acrylic resin (A-1) and a curing catalyst (A-2) as essential components, the curing agent (B) contains an isocyanate compound (B-1) and an alkoxysilyl group-containing copolymer (B-2) as essential components, the aforesaid hydroxy group-containing acrylic resin (A-1) has a hydroxyl value of 80 to 180 mg KOH/g, a glass transition temperature of −40 to 40° C., and a weight average molecular weight of 2,000 to 20,000 g/mol, the aforesaid alkoxysilyl group-containing copolymer (B-2) is a copolymer obtained by copolymerizing 30 to 80 parts by weight of a vinylic monomer containing alkoxysilyl groups and 20 to 70 parts by weight of other copolymerizable monomers, its weight average molecular weight is 2,000 to 20,000 g/mol, and it does not contain hydroxy groups, carboxyl groups or amino groups which react with isocyanate groups.

Further, among the aforesaid two-component paint compositions, the present invention provides two-component paint compositions wherein the hydroxy group-containing acrylic resin (A-1) is a hydroxy group-containing acrylic resin of hydroxyl value 80 to 160 mg KOH/g derived from 4-hydroxybutyl (meth)acrylate.

Further, among the aforesaid two-component paint compositions, the present invention provides two-component paint compositions characterized in that they are mixed such that the isocyanate groups of the isocyanate compound (B-1) are in a proportion of 0.5 to 1.5 equivalents per equivalent of hydroxy groups in the hydroxy group-containing acrylic resin (A-1).

Further, among the aforesaid two-component paint compositions, the present invention provides two-component paint compositions wherein, in the curing agent (B), the non-volatiles content of the aforesaid alkoxysilyl group-containing copolymer (B-2) are in a proportion of 20 to 80 parts by weight per 100 parts by weight of the combined non-volatiles contents of the aforesaid isocyanate compound (B-1) and the aforesaid alkoxysilyl group-containing polymer (B-2).

Further, the present invention relates to a method for forming multilayer paint films, wherein an intermediate coat paint is applied onto an electrocoated steel plate, a base coat paint is applied wet-on-wet, an aforesaid two-component paint composition is then applied wet-on-wet, and thermal curing is simultaneously effected.

Further, it relates to a method for forming multilayer paint films, wherein an intermediate coat paint is applied onto an electrocoated steel plate, a base coat paint is applied wet-on-wet, and then a clear paint composition is applied wet-on-wet and thermal curing is effected, after which an aforesaid two-component paint composition is applied, and thermal curing is effected.

Effect of Invention

By the use of the two-component paint composition of the present invention, and the multilayer coating formation method using this, among two-component top coat paints for the automobile coatings field, wherein the base resin paint is circulated from a main tank with a pump upstream of the coating gun, and mixing and coating are effected using a curing agent supplied from a nitrogen-sealed tank and a two-component mixing device, it becomes possible to obtain paint films with no coating stability problems such as thickening and gelling, coating is possible with a stabilized constant coating viscosity, and which exhibit excellent scratch resistance, stain resistance, acid resistance and gasoline resistance.

Embodiments of the Invention

The two-component paint compositions and multilayer coating formation method of the present invention are explained in detail below.

As the base resin (A), the two-component paint compositions of the present invention contain a hydroxy group-containing acrylic resin (A-1) having a hydroxyl value of 80 to 180 mg KOH/g, a glass transition temperature of −40 to 40° C., and a weight average molecular weight of 2,000 to 20,000 g/mol.

As regards the hydroxyl value of the hydroxy group-containing acrylic resin (A-1), the hydroxyl value derived from 4-hydroxybutyl (meth)acrylate is preferably 80 to 160 mg KOH/g. This hydroxyl value is preferably 90 to 150 mg KOH/g and more preferably 100 to 140 mg KOH/g. If the hydroxyl value derived from 4-hydroxybutyl (meth)acrylate is less than 80 mg KOH/g, the paint film crosslink flexibility is insufficient, and the scratch resistance decreases. On the other hand, if the hydroxyl value derived from 4-hydroxybutyl (meth)acrylate exceeds 160 mg KOH/g, the polarity of the resin becomes too high, the compatibility with the isocyanate compound (B-1) and the alkoxysilyl group-containing copolymer (B-2) of the curing agent (B) is poor, and the paint film may become cloudy.

The hydroxyl value of the hydroxy group-containing acrylic resin (A-1) amounts to 80 to 180 mg KOH/g on addition of the hydroxyl value derived from 4-hydroxy-butyl (meth)acrylate and the hydroxyl value derived from other hydroxy group-containing (meth)acrylates. As hydroxy group-containing (meth)acrylates other than 4-hydroxybutyl (meth)acrylate, for example 2-hydroxyethyl (meth)acrylate, 2-hydroxypropyl (meth)acrylate and 3-hydroxypropyl (meth)acrylate are mentioned. As regards the hydroxyl values derived from these hydroxy group-containing (meth) acrylates, since the number of carbons adjacent to the hydroxy group is smaller compared to the hydroxy groups derived from 4-hydroxybutyl (meth)-acrylate, the crosslink flexibility is poor. As hydroxy group-containing (meth) acrylates with superior crosslink flexibility, for example 5-hydroxypentyl (meth)acrylate and the like, wherein the number of carbons adjacent to the hydroxy group is greater can be considered, but they are not produced industrially in large quantities. Further, as hydroxy group-containing (meth)acrylates with superior crosslink flexibility, polycaprolactam-modified polyhydric alcohol (meth)acrylates, for example among commercial products Placcel FA-1 (trade name Daicel (Co.), monomer with 1 mole ε-caprolactam ring-opened and added to 1 mole 2-hydroxyethyl acrylate), Placcel FM-1D, Placcel FM-2D, Placcel FM-3 and Placcel FM-4 (all trade names Daicel (Co.), monomers with respectively 1 mole, 2 moles, 3 moles and 4 moles of ε-caprolactam ring-opened and added to 1 mole of 2-hydroxyethyl methacrylate) and the like are known. However, since these polycaprolactam-modified acrylic resins are readily hydrolyzed in acid resistance tests, they cannot be incorporated if the hydroxyl values derived from these exceed 20 mg KOH/g.

The glass transition temperature of the hydroxy group-containing acrylic resin (A-1) is −40 to 40° C., preferably −30 to 30° C. If the glass transition temperature is lower than −40° C., the gasoline resistance is poor, on the other hand if it exceeds 40° C., the scratch resistance and impact resistance are poor.

The glass transition temperature of the hydroxy group-containing acrylic resin (A-1) can be regulated by combining other copolymerizable vinylic monomers with the aforesaid hydroxy group-containing (meth)acrylates. As specific examples of other vinylic monomers copolymerizable with the hydroxy group-containing (meth)acrylates, for example (meth)acrylic acid, alkyl (meth)acrylates such as methyl (meth)acrylate, ethyl (meth)acrylate, butyl (meth)acrylate, 2-ethylhexyl (meth)acrylate, lauryl (meth)acrylate and stearyl (meth)acrylate, esters of dibasic acids such as itaconic acid, maleic acid and fumaric acid, styrene, nuclear-substituted styrenes such as vinyltoluene, dimethylstyrene and ethylstyrene, cyclohexyl (meth)acrylate, glycidyl (meth) acrylate, (meth)acrylonitrile, (meth)acrylamide, vinyl acetate, vinyl chloride and the like are mentioned. The other copolymerizable vinylic monomer(s) can be used alone or 2 or more can be used in combination.

The hydroxy group-containing acrylic resin (A-1) can be obtained by copolymerizing a hydroxy group-containing (meth)acrylate and another copolymerizable vinylic monomer, and its weight average molecular weight is 2,000 to 20,000 g/mol, preferably 3,000 to 18,000 g/mol and more preferably 4,000 to 16,000 g/mol. If the weight average molecular weight is less than 2,000 g/mol, the gasoline resistance may be poor. On the other hand, if the weight average molecular weight exceeds 20,000 g/mol, the compatibility with the curing agent (B) is poor and defects such as clouding of the paint film may occur. Further, if the weight average molecular weight exceeds 20,000 g/mol, the uniformity during spray coating may be poor, causing orange peel effects.

It should be noted that weight average molecular weight in the present specification is the value obtained by gel permeation chromatography (GPC) using polystyrene as the reference substance.

There is no particular restriction as to the method for polymerization of the hydroxy group-containing acrylic resin (A-1), and normal methods described in the known literature such as the solution radical polymerization method can be used. For example, a method of stirring during dropwise addition of a mixed solution of a suitable radical polymerization initiator and monomers to a suitable solvent over 2-10 hours at a polymerization temperature of 60 to 160° C. is mentioned. There is no particular restriction as to the radical polymerization initiator used here if it is normally used in polymerization, and organic peroxide polymerization initiators, azo polymerization initiators and the like are mentioned. There is no particular restriction as to the quantity of polymerization initiator used, but it is usually 0.1 to 15 mass %, preferably 0.5 to 12 mass %, relative to the total weight of monomer. Further, there is no particular restriction as to the solvent used here, provided it has no effect on the reaction, and for example aromatic solvents such as toluene and xylene, aliphatic solvents such as mineral spirit, ester solvents such as ethyl acetate and butyl acetate and ketone solvents such as methyl ethyl ketone can be used alone or mixed.

The base resin (A) of the present invention contains an aforesaid hydroxy group-containing acrylic resin (A-1) and curing catalyst (A-2) as essential components.

As specific examples of the curing catalyst (A-2) used in the present invention, for example organotin compounds such as dibutyltin laurate, dibutyltin dimaleate, dioctyltin laurate, dioctyltin dimaleate and tin octanoate, phosphoric acid, phosphate esters such as monomethyl phosphate, monoethyl phosphate, monobutyl phosphate, monooctyl phosphate, monodecyl phosphate, dimethyl phosphate, diethyl phosphate, dibutyl phosphate, dioctyl phosphate and dodecyl phosphate, adducts of epoxy compounds such as propylene oxide, butylene oxide, cyclohexene oxide, glycidyl methacrylate, glycidol, allyl glycidyl ether, γ-glycidoxypropyltrimethoxysilane, γ-glycidoxypropyltriethoxysilane and γ-glycidoxypropyl-methyldimethoxysilane and phosphoric acid and (or) monoacid phosphate esters, acidic compounds such as organotitanate compounds, organoaluminum compounds, organozirconium compounds, maleic acid, adipic acid, azelaic acid, sebacic acid, itaconic acid, citric acid, succinic acid, phthalic acid, trimellitic acid, pyromellitic acid, anhydrides thereof, and para-toluenesulfonic acid, amines such as hexylamine, di-2-ethyl-hexylamine, N,N-dimethyldodecylamine and dodecylamine, mixtures or reaction products of these amines and acidic phosphate esters, alkaline compounds such as sodium hydroxide and potassium hydroxide, and the like, are mentioned.

Among these curing catalysts (A-2), organotin compounds, acidic phosphate esters, and mixtures or reaction products of acidic phosphate esters and amines are preferable. Such curing catalysts (A-2) can be used alone, or 2 or more can be used together.

The curing catalyst (A-2) is preferably incorporated at 0.01 to 10 parts by weight per 100 parts by weight of the non-volatiles content of the mixture of the base resin (A) and curing agent (B) which is the two-component paint composition of the present invention.

With less than 0.01 parts by weight of curing catalyst (A-2), the curing properties may be insufficient, and if it exceeds 10 parts by weight, the pot life after mixing the base resin (A) and curing agent (B) becomes extremely short, and blockages and matter may form in the hose between the two-component mixing device and the coating gun.

Apart from the hydroxy group-containing acrylic resin (A-1) and the curing catalyst (A-2), the base resin (A) of the present invention can as necessary contain organic solvents and various additives, for example UV absorbers, photostabilizers, antioxidants, surface modifiers, conductivity additives, and also rheology modifiers such as polyethylene wax, polyamide wax, internally crosslinked resin microparticles, and the like.

The base resin (A) of the present invention can either be used as the base resin in an uncolored clear coating agent, or can be used as the base resin in a colored clear coating agent after incorporation of a coloring agent such as a dye or pigment.

The curing agent (B) of the present invention contains an isocyanate compound (B-1) and an alkoxysilyl group-containing copolymer (B-2) as essential components. The alkoxysilyl group-containing copolymer (B-2) is a copolymer obtained by copolymerizing 30 to 80 parts by weight of a vinylic monomer containing alkoxysilyl groups and 20 to 70 parts by weight of other copolymerizable monomers, and does not contain hydroxy groups, carboxyl groups or amino groups which react with isocyanate groups.

As the isocyanate compound (B-1) of the present invention, aliphatic and alicyclic non-yellowing polyisocyanate compounds are preferably used. As typical examples, reaction products of hexamethylene diisocyanate and/or isophorone diisocyanate and polyhydric alcohols and/or low molecular weight polyester polyols, isocyanurates which are polymers of hexamethylene diisocyanate and/or isophorone diisocyanate or biurets obtained by further reacting to urethane linkages, and the like are mentioned. The isocyanate compounds can either be used alone, or 2 or more can be used together. Particularly preferably, the isocyanate compound (B-1) is an isocyanurate of hexamethylene diisocyanate.

The alkoxysilyl group-containing vinylic monomer used in the alkoxysilyl group-containing copolymer (B-2) of the present invention is 30 to 80 parts by weight, preferably 40 to 70 parts by weight, more preferably 50 to 60 parts by weight, relative to 100 parts by weight of non-volatiles content of the alkoxysilyl group-containing copolymer (B-2). If the alkoxysilyl group-containing vinylic monomer is less than 30 parts by weight, the scratch resistance and stain resistance are not sufficient, and if it exceeds 80 parts by weight, the compatibility with the hydroxy group-containing acrylic resin (A-1) and isocyanate compound (B-1) is not sufficient and the paint film may be cloudy.

As specific examples of alkoxysilyl group-containing vinylic monomers used in the alkoxysilyl group-containing copolymer (B-2) of the present invention, for example vinyltrimethoxysilane, vinylmethyldimethoxysilane, vinyltriethoxysilane, vinylmethyldiethoxysilane, 3-acryloxypropyltrimethoxysilane, 3-acryloxypropylmethyl-dimethoxysilane, 3-methacryloxypropyltrimethoxysilane, 3-methacryloxypropylmethyldimethoxysilane, 3-methacryloxypropyltriethoxysilane, 3-methacryloxypropylmethyl-diethoxysilane, p-styryltrimethoxysilane, p-styryl-triethoxysilane and the like are mentioned. As the alkoxy group bonded to silicon, the methyl group, ethyl group, n-propyl group, i-propyl group, n-butyl group, i-butyl group and the like are mentioned, but since the reactivity of alkoxysilyl groups decreases as the number of carbon atoms in the alkyl group becomes higher, the methyl group and ethyl group are preferable, and the methyl group is particularly preferable.

The monomers copolymerized with the alkoxysilyl group-containing vinylic monomer used in the alkoxysilyl group-containing copolymer (B-2) of the present invention should not contain hydroxy groups, carboxyl groups or amino groups. Since the curing agent (B) of the present invention is made by mixing an isocyanate compound (B-1) and an alkoxysilyl group-containing copolymer (B-2), if a monomer containing hydroxy groups, carboxyl groups or amino groups which react with isocyanate groups is copolymerized, the curing agent may thicken or gel.

As specific examples of monomers copolymerizable with the alkoxysilyl group-containing vinylic monomer used in the alkoxysilyl group-containing copolymer (B-2) of the present invention, for example alkyl (meth)acrylates such as methyl (meth)acrylate, ethyl (meth)acrylate, butyl (meth)acrylate, 2-ethylhexyl (meth)acrylate, lauryl (meth)acrylate and stearyl (meth)acrylate, styrene, nuclear-substituted styrenes such as vinyltoluene, dimethylstyrene and ethylstyrene, cyclohexyl (meth)-acrylate and the like are mentioned. These other copolymerizable vinylic monomers can be used alone, or 2 or more can be used together.

The weight average molecular weight of the alkoxysilyl group-containing copolymer (B-2) of the present invention is 2,000 to 20,000 g/mol, preferably 3,000 to 18,000 g/mol, more preferably 4,000 to 16,000 g/mol. If the weight average molecular weight is less than 2,000 g/mol, the gasoline resistance may be poor. On the other hand, if the weight average molecular weight exceeds 20,000 g/mol, the compatibility with the isocyanate compound (B-1) and the hydroxy group-containing acrylic resin (A-1) of the base resin (A) is poor, and defects such as clouding of the paint film may occur.

In the curing agent (B) of the present invention, the non-volatiles content of the alkoxysilyl group-containing copolymer (B-2) is 20 to 80 parts by weight, preferably 30 to 70 parts by weight, more preferably 40 to 60 parts by weight, per 100 parts by weight combined of the isocyanate compound (B-1) and the non-volatiles content of the alkoxysilyl group-containing copolymer (B-2). If the non-volatiles content of the alkoxysilyl group-containing copolymer (B-2) is less than 20 parts by weight, the stain resistance is poor. On the other hand, if it exceeds 80 parts by weight, the flexibility of the paint film becomes poor and impact resistance and scratch resistance may be poor.

The curing agent (B) of the present invention can be used dissolved in an organic solvent. There is no particular restriction as to the organic solvent, provided it does not react with isocyanate groups or alkoxysilyl groups, and for example aromatic solvents such as toluene and xylene, aliphatic solvents such as mineral spirit, ester solvents such as ethyl acetate and butyl acetate and ketone solvents such as methyl ethyl ketone can be used alone or mixed. These can be used as a single type or 2 or more types can be used together.

In the two-component paint compositions of the present invention, the base resin (A) and the curing agent (B) are mixed in a two-component mixing device, such that the isocyanate groups of the isocyanate compound (B-1) of the curing agent (B) are in a proportion of 0.5 to 1.5 equivalents, preferably 0.8 to 1.2 equivalents, per equivalent of hydroxy groups in the hydroxy group-containing acrylic resin (A-1) of the base resin (A), and then applied. With less than 0.5 equivalents of isocyanate groups of the isocyanate compound (B-1), the curing properties become insufficient, and the gasoline resistance decreases. On the other hand, if the isocyanate groups of the isocyanate compound (B-1) exceed 1.5 equivalents, effects commensurate with this cannot be expected, and the recoat adhesion may decrease.

The two-component mixing device is such that the two components, base resin (A) and curing agent (B), can be continuously mixed in set volumes, and the two-component paint composition is mixed uniformly in a static mixer or the like, and supplied to the coating device.

There is no particular restriction as to the method for coating the two-component paint composition of the present coating agent, and previously known techniques can be appropriately selected and used. As preferable coating methods, electrostatic coating (bell type, REA method and the like), air spray coaters and the like are mentioned. In these coating methods, it is normally suitable if a diluted paint made by mixing the base resin and curing agent is applied such that it has a viscosity of about 15 to 35 seconds (Ford cup #4/20° C.) The coating thickness of the two-component paint composition of the present invention, as cured paint film, is preferably 20 to 80 μm, particularly 25 to 50 μm.

As the curing conditions for the two-component paint compositions of the present invention, for example this can be effected by heating at 60 to 160° C. for about 20 to 60 minutes.

As coating substrate materials for which the present invention is suitable, metal plates including iron, aluminum, copper or alloys thereof, resin molded products of polyethylene, polypropylene, ethylene-vinyl acetate copolymers, polyamide, polyacrylates, polyester, vinyl chloride resins, vinylidene chloride resins, polycarbonate, polyurethane and acrylonitrile-butadiene-styrene copolymers and plastic materials such as various FRP are mentioned. It should be noted that a suitable primer and base coat paints can optionally be applied onto these coating substrate materials beforehand.

As multilayer coating formation methods using the two-component paint compositions of the present invention, for example a multilayer coating formation method can be used wherein firstly an intermediate coat paint is applied onto an electrocoated steel plate, a base coat paint is applied onto the heat-treated substrate, and a two-component paint composition of the present invention is applied wet-on-wet, and thermal curing is simultaneously effected.

Further, for example, a multilayer coating method can be used wherein an intermediate coat paint is applied onto an electrocoated steel plate, a base coat paint is applied wet-on-wet, and then a two-component paint composition of the present invention is applied wet-on-wet, and thermal curing is simultaneously effected.

Further, for example, a multilayer coating method can be used wherein an intermediate coat paint is applied onto an electrocoated steel plate, a base coat paint is applied wet-on-wet, and then a clear paint composition different from the clear paint composition of the present invention is applied wet-on-wet and thermal curing is effected, after which a two-component paint composition of the present invention is applied, and thermal curing is effected.

PRACTICAL EXAMPLES

Next, the present invention is illustrated more specifically by means of practical examples, but the present invention is in no way restricted by these practical examples. It should be noted that in the practical examples and comparative examples "parts" means parts by weight, and "%" means mass %.

The properties of the paint films obtained using the two-component paint compositions of the present invention were determined as follows:

(1) External appearance (transparency of paint film) The paint films were assessed by visual inspection according to the following standard:
◯ no clouding observed,
X: clouding observed.

(2) Carwash Scratch Resistance

After applying muddy water (made by mixing JIS Z 8901 test dust 8/water/neutral detergent in weight ratio=10/99/1) to the test plates with a brush, the test plates were washed with running water in an automobile carwash for 10 seconds with carwash brushes rotating at 150 rpm. After repetition of the above operation 10 times, the degree of scratching of the test piece surface was measured with a colorimeter (brand name "CR-331", Minolta Camera (Co.)). The degree of scratching was assessed by measuring the absolute value of the difference in lightness (ΔL) before and after the test. The lower this value is, the better the scratch resistance.
◉: ΔL≤3.0
◯: 3.0<ΔL≤5.0
Δ: 5.0<ΔL≤10.0
X: 10.0<ΔL≤15.0
XX: 15.0<ΔL With assessments of Δ or better, it was judged that the paint films had good carwash scratch resistance.

(3) Stain Resistance

A mixture of carbon black/JIS Z test dust 8/water in a weight ratio=1/1/98 was sprayed onto test plates, and dried for 10 mins at 60° C. After repeating the above operation 5 times, staining was removed by rubbing the test plate surface 3 times backwards and forwards with a flannel under running water flowing at 2 L/min from a mains water tap. After removal of water drops with an air blower, the degree of staining of the test piece surfaces was measured with a colorimeter (brand name "CR-331", Minolta Camera (Co.)). The degree of staining was assessed by measuring the absolute value of the difference in lightness (ΔL) before and after the test.

The lower this value is, the better the stain resistance.
◉: ΔL≤1.0
◯: 1.0<ΔL≤3.0
Δ: 3.0<ΔL≤6.0
X: 6.0<ΔL≤9.0
XX: 9.0<ΔL With assessments of Δ or better, it was judged that the paint films had good stain resistance.

(4) Acid Resistance 0.2 ml of 40% aqueous sulfuric acid was placed in spot form on the test pieces, and they were heated for 15 mins at 60° C., after which they were washed with water and visually examined for stain formation.

◯: practically no change seen in paint film
Δ: slight water staining seen on paint film
X: pronounced water staining seen on paint film.

(5) Gasoline Resistance

The test plates were immersed for 24 hours at 20° C. in unleaded regular gasoline (described in JIS K2202 § 2), and their appearance was observed visually, and assessed according to the standard shown below:
◯: no abnormality observed
Δ: abnormalities such as slight yellowing and swelling observed
X: abnormalities such as yellowing and swelling observed.

Production Example A1

Production Of Hydroxy Group-containing Acrylic Resin Varnish A-1-1

27.0 parts of xylene and 9.0 parts of propylene glycol monomethoxy ether acetate were placed in a 4-neck flask fitted with a thermometer, reflux condenser, stirrer and dropping funnel, and this was heated with stirring under a nitrogen flow and maintained at 130° C. Next, at temperature 130° C., 11.0 parts of styrene, 0.8 parts of methacrylic acid, 16.9 parts of 4-hydroxybutyl acrylate, 24.7 parts of i-butyl methacrylate and 1.5 parts of n-butyl methacrylate radical polymerizable monomers, and 1.0 part of t-butyl peroxy-2-ethylhexanoate as the polymerization initiator were homogeneously mixed and added dropwise from the dropping funnel at a constant rate over 3 hours. After completion of the dropwise addition, the temperature was maintained at 130° C. for 1 hour, then the reaction temperature was lowered to 110° C.

Then, as supplementary catalyst, 0.1 parts of t-butyl peroxy-2-ethylhexanoate were added as polymerization initiator, and then after maintaining the temperature at 110° C. for 2 hours, it was thinned and cooled by adding 7.9 parts of xylene, and the hydroxy group-containing acrylic resin varnish A-1-1 was obtained.

Production Examples A2 to A13

Production of Hydroxy Group-containing Acrylic Resin Varnishes A-1-2 to 13

The hydroxy group-containing acrylic resin varnishes A-1-2 to 13 were obtained by the same production method as for A-1-1, except that the quantities introduced of the starting materials shown in table 1 were varied.

TABLE 1

| | | production example | | | | | | |
|---|---|---|---|---|---|---|---|---|
| | | A1 | A2 | A3 | A4 | A5 | A6 | A7 |
| hydroxy group-containing acrylic resin (A-1) varnish | | A-1-1 | A-1-2 | A-1-3 | A-1-4 | A-1-5 | A-1-6 | A-1-7 |
| starting solvents | xylene | 27.0 | 27.0 | 27.0 | 27.0 | 27.0 | 27.0 | 27.0 |
| | propylene glycol monomethoxy ether acetate | 9.0 | 9.0 | 9.0 | 9.0 | 9.0 | 9.0 | 9.0 |
| monomers added dropwise | 4-hydroxybutyl acrylate | 16.9 | 12.7 | 12.7 | 21.2 | 8.5 | | 16.9 |
| | hydroxyethyl acrylate | | 6.4 | | 2.6 | | 26.8 | |
| | styrene | 11.0 | 5.5 | 11.0 | 11.0 | 5.5 | 5.5 | 11.0 |
| | i-butyl methacrylate | 24.7 | 5.3 | 16.5 | 19.4 | | | 8.3 |
| | n-butyl methacrylate | 1.5 | 24.3 | 8.5 | | 40.2 | | |
| | butyl acrylate | | | 5.5 | | | 21.9 | 18.0 |
| | methacrylic acid | 0.8 | 0.8 | 0.8 | 0.8 | 0.8 | 0.8 | 0.8 |
| catalyst | t-butyl peroxy-2-ethylhexanoate | 1.0 | 1.0 | 1.0 | 1.0 | 1.0 | 1.0 | 1.0 |
| supplementary catalyst | t-butyl peroxy-2-ethylhexanoate | 0.1 | 0.1 | 0.1 | 0.1 | 0.1 | 0.1 | 0.1 |
| thinning solvent | xylene | 7.9 | 7.9 | 7.9 | 7.9 | 7.9 | 7.9 | 7.9 |
| total | | 100 | 100 | 100 | 100 | 100 | 100 | 100 |
| resin hydroxyl number (mgKOH/g) | | 120 | 140 | 90 | 170 | 60 | 210 | 120 |
| 4-hydroxybutyl acrylate-derived resin hydroxyl number (mgKOH/g) | | 120 | 90 | 90 | 150 | 60 | 0 | 120 |
| resin design glass transition temperature (° C.) | | 0 | 0 | 0 | −9 | 4.9 | 4.2 | −30 |
| non-volatiles content (%) | | 55 | 55 | 55 | 55 | 55 | 55 | 55 |
| weight average molecular weight | | 10,000 | 10,000 | 10,000 | 10,000 | 10,000 | 10,000 | 10,000 |

| | | production example | | | | | |
|---|---|---|---|---|---|---|---|
| | | A8 | A9 | A10 | A11 | A12 | A13 |
| hydroxy group-containing acrylic resin (A-1) varnish | | A-1-8 | A-1-9 | A-1-10 | A-1-11 | A-1-12 | A-1-13 |
| starting solvents | xylene | 27.0 | 27.0 | 27.0 | 27.0 | 27.0 | 27.0 |
| | propylene glycol monomethoxy ether acetate | 9.0 | 9.0 | 9.0 | 9.0 | 9.0 | 9.0 |
| monomers added dropwise | 4-hydroxybutyl acrylate | 12.7 | 16.9 | 16.9 | 16.9 | | 8.5 |
| | hydroxyethyl acrylate | 3.9 | | | | 15.3 | 6.8 |
| | styrene | 27.5 | 11.0 | 11.0 | 11.0 | 11.0 | 11.0 |
| | i-butyl methacrylate | 10.1 | 24.7 | 24.7 | 24.7 | 10.2 | 13.0 |
| | n-butyl methacrylate | | 1.5 | 1.5 | 1.5 | 17.7 | 2.0 |
| | butyl acrylate | | | | | | 12.8 |
| | methacrylic acid | 0.8 | 0.8 | 0.8 | 0.8 | 0.8 | 0.8 |
| catalyst | t-butyl peroxy-2-ethylhexanoate | 1.0 | 1.6 | 0.7 | 0.6 | 1.0 | 1.0 |
| supplementary catalyst | t-butyl peroxy-2-ethylhexanoate | 0.1 | 0.1 | 0.1 | 0.1 | 0.1 | 0.1 |
| thinning solvent | xylene | 7.9 | 7.3 | 8.2 | 8.3 | 7.9 | 8.0 |
| total | | 100 | 100 | 100 | 100 | 100 | 100 |
| resin hydroxyl number (mgKOH/g) | | 120 | 120 | 120 | 120 | 120 | 120 |
| 4-hydroxybutyl acrylate-derived resin hydroxyl number (mgKOH/g) | | 90 | 120 | 120 | 120 | 0 | 60 |
| resin design glass transition temperature (° C.) | | 26 | 0 | 0 | 0 | 50 | 0 |
| non-volatiles content (%) | | 55 | 55 | 55 | 55 | 55 | 55 |
| weight average molecular weight | | 10,000 | 4,000 | 20,000 | 26,000 | 10,000 | 10,000 |

Production Examples B1-B7

Production of Alkoxysilyl Group-containing Copolymer Solutions B-2-1-7

The alkoxysilyl group-containing copolymer solutions B-2-1-7 were obtained by the same production method as for comparative example A1, except that the quantities of the starting materials shown in table 2 introduced were varied.

TABLE 2

| | | production examples | | | | | | |
|---|---|---|---|---|---|---|---|---|
| | | B1 | B2 | B3 | B4 | B5 | B6 | B7 |
| alkoxysilyl group-containing copolymer (B-2) solution | | B-2-1 | B-2-2 | B-2-3 | B-2-4 | B-2-5 | B-2-6 | B-2-7 |
| starting solvent | xylene | 36.0 | 36.0 | 36.0 | 36.0 | 36.0 | 36.0 | 36.0 |
| monomers added dropwise | 3-methacryloxypropyltrimethoxysilane | 25.0 | 20.0 | 35.0 | 10.0 | 45.0 | 25.0 | 25.0 |
| | styrene | 5.0 | 5.0 | 5.0 | 5.0 | 5.0 | 5.0 | 5.0 |
| | methyl methacrylate | 20.0 | 25.0 | 10.0 | 35.0 | | 20.0 | 20.0 |
| catalyst | t-butyl peroxy-2-ethylhexanoate | 0.9 | 0.9 | 0.9 | 0.9 | 0.9 | 1.4 | 0.7 |
| supplementary catalyst | t-butyl peroxy-2-ethylhexanoate | 0.1 | 0.1 | 0.1 | 0.1 | 0.1 | 0.1 | 0.1 |
| thinning solvent | xylene | 13.0 | 13.0 | 13.0 | 13.0 | 13.0 | 12.5 | 13.2 |
| total | | 100 | 100 | 100 | 100 | 100 | 100 | 100 |
| content of alkoxysilyl group-containing vinylic monomer in monomer composition (%) | | 50 | 40 | 70 | 20 | 90 | 50 | 50 |
| non-volatiles content (%) | | 50 | 50 | 50 | 50 | 50 | 50 | 50 |
| weight average molecular weight | | 10,000 | 10,000 | 10,000 | 10,000 | 10,000 | 4,000 | 17,000 |

Practical Examples 1-23, Comparative Examples 1-7

The starting materials shown in tables 3-5 were mixed consecutively and stirred so that they became homogeneous, thus making the two-component compositions made up of the base resin (A) and the curing agent (B).

TABLE 3

| | | | practical example | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 |
| clear coat paint name | | | CC-1 | CC-2 | CC-3 | CC-4 | CC-5 | CC-6 | CC-7 | CC-8 | CC-9 | CC-10 | CC-11 | CC-12 |
| base resin | hydroxy group-containing acrylic resin (A-1) varnish | A-1-1 | 49.8 | 54.8 | 45.7 | 57.2 | 38.3 | | | | | | 62.4 | 17.8 |
| | | A-1-2 | | | | | | 46.3 | 51.4 | 42.2 | 53.9 | 34.9 | | |
| | curing catalyst (A-2) | NACURE4167 | 2.0 | 2.0 | 2.0 | 2.0 | 2.0 | 2.0 | 2.0 | 2.0 | 2.0 | 2.0 | 2.0 | 2.0 |
| | UV absorber | Tinuvin 384-2 | 1.5 | 1.5 | 1.5 | 1.5 | 1.5 | 1.5 | 1.5 | 1.5 | 1.5 | 1.5 | 1.5 | 1.5 |
| | photostabilizer | Tinuvin 292 | 1.0 | 1.0 | 1.0 | 1.0 | 1.0 | 1.0 | 1.0 | 1.0 | 1.0 | 1.0 | 1.0 | 1.0 |
| | surface modifier | BYK-300 | 0.2 | 0.2 | 0.2 | 0.2 | 0.2 | 0.2 | 0.2 | 0.2 | 0.2 | 0.2 | 0.2 | 0.2 |
| | solvent | Solvesso 100 | 8.6 | 7.5 | 9.6 | 10.0 | 6.5 | 9.4 | 8.3 | 10.3 | 11.0 | 6.9 | 11.0 | 2.7 |
| curing agents | isocyanate compound (B-1) | Sumidure N3300 | 11.3 | 9.9 | 12.4 | 13.0 | 8.7 | 12.3 | 10.9 | 13.4 | 14.2 | 9.2 | 14.1 | 4.0 |
| | alkoxysilyl group-containing copolymer (B-2) solution | B-2-1 | 20.5 | 18.1 | 22.6 | 10.1 | 36.8 | 22.3 | 19.8 | 24.3 | 11.1 | 39.2 | 2.9 | 65.8 |
| | solvent | xylene | 5.0 | 5.0 | 5.0 | 5.0 | 5.0 | 5.0 | 5.0 | 5.0 | 5.0 | 5.0 | 5.0 | 5.0 |
| total | | | 100 | 100 | 100 | 100 | 100 | 100 | 100 | 100 | 100 | 100 | 100 | 100 |
| quantity of curing catalyst (A-2) added (non-volatiles content %) | | | 0.5 | 0.5 | 0.5 | 0.5 | 0.5 | 0.5 | 0.5 | 0.5 | 0.5 | 0.5 | 0.5 | 0.5 |
| isocyanate compound (B-1) NCO/hydroxy group-containing acrylic resin (A-1) OH mole ratio | | | 1 | 0.8 | 1.2 | 1 | 1 | 1 | 0.8 | 1.2 | 1 | 1 | 1 | 1 |
| Proportion (%) of (B-2) non-volatiles content relative to non-volatiles content of (B-1) + (B-2) | | | 50 | 50 | 50 | 30 | 70 | 50 | 50 | 50 | 30 | 70 | 10 | 90 |

TABLE 4

| | | | practical example | | | | | | | | | | | |
|---|---|---|---|---|---|---|---|---|---|---|---|---|---|---|
| | | | 13 | 14 | 15 | 16 | 17 | 18 | 19 | 20 | 21 | 22 | 23 |
| clear coat paint name | | | CC-13 | CC-14 | CC-15 | CC-16 | CC-17 | CC-18 | CC-19 | CC-20 | CC-21 | CC-22 | CC-23 |
| base resin | hydroxy group-containing acrylic resin (A-1) varnish | A-1-1 | | | | | | | 49.8 | 49.8 | 49.8 | 49.8 | |
| | | A-1-3 | 56.2 | | | | | | | | | | |
| | | A-1-4 | | 41.9 | | | | | | | | | |
| | | A-1-7 | | | 49.8 | | | | | | | | |
| | | A-1-8 | | | | 49.8 | | | | | | | |
| | | A-1-9 | | | | | 49.8 | | | | | | |
| | | A-1-10 | | | | | | 49.8 | | | | | |
| | | A-1-13 | | | | | | | | | | | 49.8 |
| | curing catalyst (A-2) | NACURE4167 | 2.0 | 2.0 | 2.0 | 2.0 | 2.0 | 2.0 | 2.0 | 2.0 | 2.0 | 2.0 | 2.0 |
| | UV absorber | Tinuvin 384-2 | 1.5 | 1.5 | 1.5 | 1.5 | 1.5 | 1.5 | 1.5 | 1.5 | 1.5 | 1.5 | 1.5 |
| | photostabilizer | Tinuvin 292 | 1.0 | 1.0 | 1.0 | 1.0 | 1.0 | 1.0 | 1.0 | 1.0 | 1.0 | 1.0 | 1.0 |
| | surface modifier | BYK-300 | 0.2 | 0.2 | 0.2 | 0.2 | 0.2 | 0.2 | 0.2 | 0.2 | 0.2 | 0.2 | 0.2 |
| | solvent | Solvesso 100 | 7.2 | 10.4 | 8.6 | 8.6 | 8.6 | 8.6 | 8.6 | 8.6 | 8.6 | 8.6 | 8.6 |
| curing agents | isocyanate compound (B-1) | Sumidure N3300 | 9.5 | 13.5 | 11.3 | 11.3 | 11.3 | 11.3 | 11.3 | 11.3 | 11.3 | 11.3 | 11.3 |
| | alkoxysilyl group-containing copolymer (B-2) solution | B-2-1 | 17.4 | 24.5 | 20.5 | 20.5 | 20.5 | 20.5 | | | | | 20.5 |
| | | B-2-2 | | | | | | | 20.5 | | | | |
| | | B-2-3 | | | | | | | | 20.5 | | | |
| | | B-2-6 | | | | | | | | | 20.5 | | |
| | | B-2-7 | | | | | | | | | | 20.5 | |
| | solvent | xylene | 5.0 | 5.0 | 5.0 | 5.0 | 5.0 | 5.0 | 5.0 | 5.0 | 5.0 | 5.0 | 5.0 |
| total | | | 100 | 100 | 100 | 100 | 100 | 100 | 100 | 100 | 100 | 100 | 100 |
| quantity of curing catalyst (A-2) added (non-volatiles content %) | | | 0.5 | 0.5 | 0.5 | 0.5 | 0.5 | 0.5 | 0.5 | 0.5 | 0.5 | 0.5 | 0.5 |
| isocyanate compound (B-1) NCO/hydroxy group-containing acrylic resin (A-1) OH mole ratio | | | 1 | 1 | 1 | 1 | 1 | 1 | 1 | 1 | 1 | 1 | 1 |
| Proportion (%) of (B-2) non-volatiles content relative to non-volatiles content of (B-1) + (B-2) | | | 50 | 50 | 50 | 50 | 50 | 50 | 50 | 50 | 50 | 50 | 50 |

TABLE 5

| | | | comparative example | | | | | | |
|---|---|---|---|---|---|---|---|---|---|
| | | | 1 | 2 | 3 | 4 | 5 | 6 | 7 |
| clear coat paint name | | | CC-24 | CC-25 | CC-26 | CC-27 | CC-28 | CC-29 | CC-30 |
| base resin | hydroxy group-containing acrylic resin (A-1) varnish | A-1-1 | 49.8 | | | | 49.8 | 49.8 | |
| | | A-1-5 | | 64.4 | | | | | |
| | | A-1-6 | | | 37.2 | | | | |
| | | A-1-11 | | | | | | | 49.8 |
| | | A-1-12 | | | | 49.8 | | | |
| | curing catalyst (A-2) | NACURE4167 | | 2.0 | 2.0 | 2.0 | 2.0 | 2.0 | 2.0 |
| | UV absorber | Tinuvin 384-2 | 1.5 | 1.5 | 1.5 | 1.5 | 1.5 | 1.5 | 1.5 |
| | photostabilizer | Tinuvin 292 | 1.0 | 1.0 | 1.0 | 1.0 | 1.0 | 1.0 | 1.0 |
| | surface modifier | BYK-300 | 0.2 | 0.2 | 0.2 | 0.2 | 0.2 | 0.2 | 0.2 |
| | solvent | Solvesso 100 | 10.6 | 5.4 | 11.5 | 8.6 | 8.6 | 8.6 | 8.7 |
| curing agents | isocyanate compound (B-1) | Sumidure N3300 | 11.3 | 7.3 | 14.8 | 11.3 | 11.3 | 11.3 | 11.3 |
| | alkoxysilyl group-containing copolymer (B-2) solution | B-2-1 | 20.5 | 13.3 | 26.8 | 20.5 | | | 20.5 |
| | | B-2-4 | | | | | 20.5 | | |
| | | B-2-5 | | | | | | 20.5 | |
| | solvent | xylene | 5.0 | 5.0 | 5.0 | 5.0 | 5.0 | 5.0 | 5.0 |
| total | | | 100 | 100 | 100 | 100 | 100 | 100 | 100 |
| quantity of curing catalyst (A-2) added (non-volatiles content %) | | | 0 | 0.5 | 0.5 | 0.5 | 0.5 | 0.5 | 0.5 |
| isocyanate compound (B-1) NCO/hydroxy group-containing acrylic resin (A-1) OH mole ratio | | | 1 | 1 | 1 | 1 | 1 | 1 | 1 |
| Proportion (%) of (B-2) non-volatiles content relative to non-volatiles content of (B-1) + (B-2) | | | 50 | 50 | 50 | 50 | 50 | 50 | 50 |

Notes to Tables

1) NACURE 4167: brand name, King Industries (Co.), amine blocked phosphate compound solution (non-volatiles content 25 mass %).
2) Tinuvin 384-2: brand name, BASF Japan (Co.), benzotriazole UV absorber (non-volatiles content 95 mass %).
3) Tinuvin 292: brand name, BASF Japan (Co.), photostabilizer.
4) BYK-300, brand name, Byk Chemie (Co.), silicone surface modifier (non-volatiles content 52 mass %).
5) Solvesso 100: brand name, Exxon-Mobil (Co.), aromatic hydrocarbon solvent.
6) Sumidure N3300: brand name, Sumitomo Bayer Urethanes (Co.), HDI isocyanurate resin (non-volatiles content 100 mass %, NCO % content 21.8 mass %).

Production of Test Pieces and Study of Paint Film Performance

Zinc-plated steel plates 0.8 mm thick, 150 mm long and 70 mm wide were chemically treated with zinc phosphate and then electrocoating was performed using the cationic electrocoat paint Cathoguard 500 (brand name, BASF Japan (Co.)) so as to give a dry film thickness of 25 μm and this was stoved for 30 mins at 170° C., then spray-coated with the intermediate coat paint HS-H300 Dark Gray (brand name, BASF Japan (Co.)) so as to give a dry film thickness of 30 μm, and stoved for 20 mins at 140° C. Next, as the base coat paint, a polyurethane-polyester-melamine resin aqueous base coat paint Aqua BC-3 Black (brand name, BASF Japan (Co.)) was spray-coated so as to give a dry film thickness of 15 pm, and this was dried for 5 mins at 80° C. After cooling the test plates to room temperature, the two-component clear coat paints CC-1 to 19 base resins and curing agent were homogeneously mixed and spray-coated so as to give a dry film thickness of 30 μm and after maintaining for 10 mins at room temperature they were stoned for 20 mins at 140° C. to give the test pieces. However, for stain resistance test pieces, the tests were performed on white test plates, wherein the white HS-H300 White was used as the intermediate coat paint, and the white Aqua BC-3 White as the aqueous base coat paint.

The paint film performance test results are shown in Tables 6 to 8.

TABLE 6

| | | practical example | | | | | |
|---|---|---|---|---|---|---|---|
| | | 1 | 2 | 3 | 4 | 5 | 6 |
| clear coat paint name | | CC-1 | CC-2 | CC-3 | CC-4 | CC-5 | CC-6 |
| paint composition characteristic values and component percentages | hydroxy group-containing acrylic resin (A-1) | A-1-1 | A-1-1 | A-1-1 | A-1-1 | A-1-1 | A-1-2 |
| | resin hydroxyl number (mgKOH/g) | 120 | 120 | 120 | 120 | 120 | 140 |
| | 4-hydroxybutyl acrylate-derived resin hydroxyl number (mgKOH/g) | 120 | 120 | 120 | 120 | 120 | 90 |
| | resin design glass transition temperature (° C.) | 0 | 0 | 0 | 0 | 0 | 0 |
| | weight average molecular weight | 10,000 | 10,000 | 10,000 | 10,000 | 10,000 | 10,000 |
| | quantity of curing catalyst (A-2) added (non-volatiles content %) | 0.5 | 0.5 | 0.5 | 0.5 | 0.5 | 0.5 |
| | isocyanate compound (B-1) NCO/hydroxy group-containing acrylic resin (A-1) OH mole ratio | 1.0 | 0.8 | 1.2 | 1.0 | 1.0 | 1.0 |
| | alkoxysilyl group-containing copolymer (B-2) | B-2-1 | B-2-1 | B-2-1 | B-2-1 | B-2-1 | B-2-1 |
| | content of alkoxysilyl group-containing vinylic monomer in monomer composition (%) | 50 | 50 | 50 | 50 | 50 | 50 |
| | weight average molecular weight | 10,000 | 10,000 | 10,000 | 10,000 | 10,000 | 10,000 |
| | proportion (%) of (B-2) non-volatiles content relative to non-volatiles content of (B-1) + (B-2) | 50 | 50 | 50 | 30 | 70 | 50 |
| assessment results | external appearance (paint film transparency) | ○ | ○ | ○ | ○ | ○ | ○ |
| | carwash scratch resistance | ◎ | ○ | ◎ | ○ | ○ | ○ |
| | stain resistance | ◎ | ○ | ◎ | ○ | ◎ | ◎ |
| | acid resistance | ○ | ○ | ○ | ○ | ○ | ○ |
| | gasoline resistance | ○ | ○ | ○ | ○ | ○ | ○ |

| | | practical example | | | | | |
|---|---|---|---|---|---|---|---|
| | | 7 | 8 | 9 | 10 | 11 | 12 |
| clear coat paint name | | CC-7 | CC-8 | CC-9 | CC-10 | CC-11 | CC-12 |
| paint composition characteristic values and component percentages | hydroxy group-containing acrylic resin (A-1) | A-1-2 | A-1-2 | A-1-2 | A-1-2 | A-1-1 | A-1-1 |
| | resin hydroxyl number (mgKOH/g) | 140 | 140 | 140 | 140 | 120 | 120 |
| | 4-hydroxybutyl acrylate-derived resin hydroxyl number (mgKOH/g) | 90 | 90 | 90 | 90 | 120 | 120 |
| | resin design glass transition temperature (° C.) | 0 | 0 | 0 | 0 | 0 | 0 |
| | weight average molecular weight | 10,000 | 10,000 | 10,000 | 10,000 | 10,000 | 10,000 |
| | quantity of curing catalyst (A-2) added (non-volatiles content %) | 0.5 | 0.5 | 0.5 | 0.5 | 0.5 | 0.5 |
| | isocyanate compound (B-1) NCO/hydroxy group-containing acrylic resin (A-1) OH mole ratio | 0.8 | 1.2 | 1.0 | 1.0 | 1.0 | 1.0 |
| | alkoxysilyl group-containing copolymer (B-2) | B-2-1 | B-2-1 | B-2-1 | B-2-1 | B-2-1 | B-2-1 |
| | content of alkoxysilyl group-containing vinylic monomer in monomer composition (%) | 50 | 50 | 50 | 50 | 50 | 50 |
| | weight average molecular weight | 10,000 | 10,000 | 10,000 | 10,000 | 10,000 | 10,000 |
| | proportion (%) of (B-2) non-volatiles content relative to non-volatiles content of (B-1) + (B-2) | 50 | 50 | 30 | 70 | 10 | 90 |
| assessment results | external appearance (paint film transparency) | ○ | ○ | ○ | ○ | ○ | ○ |
| | carwash scratch resistance | ○ | ○ | ○ | ○ | ○ | ○ |
| | stain resistance | ○ | ◎ | ○ | ◎ | △ | ○ |

TABLE 6-continued

|  |  |  |  |  |  |  |
|---|---|---|---|---|---|---|
| acid resistance | ○ | ○ | ○ | ○ | ○ | ○ |
| gasoline resistance | ○ | ○ | ○ | ○ | ○ | ○ |

TABLE 7

| | | practical example | | | | | |
|---|---|---|---|---|---|---|---|
| | | 13 | 14 | 15 | 16 | 17 | 18 |
| clear coat paint name | | CC-13 | CC-14 | CC-15 | CC-16 | CC-17 | CC-18 |
| paint composition characteristic values and component percentages | hydroxy group-containing acrylic resin (A-1) | A-1-6 | A-1-7 | A-1-8 | A-1-9 | A-1-10 | A-1-11 |
| | resin hydroxyl number (mgKOH/g) | 90 | 170 | 120 | 120 | 120 | 120 |
| | 4-hydroxybutyl acrylate-derived resin hydroxyl number (mgKOH/g) | 90 | 150 | 120 | 120 | 120 | 120 |
| | resin design glass transition temperature (° C.) | 0 | 0 | −30 | 26 | 0 | 0 |
| | weight average molecular weight | 10,000 | 10,000 | 10,000 | 10,000 | 4,000 | 20,000 |
| | quantity of curing catalyst (A-2) added (non-volatiles content %) | 0.5 | 0.5 | 0.5 | 0.5 | 0.5 | 0.5 |
| | isocyanate compound (B-1) NCO/hydroxy group-containing acrylic resin (A-1) OH mole ratio | 1.0 | 1.0 | 1.0 | 1.0 | 1.0 | 1.0 |
| | alkoxysilyl group-containing copolymer (B-2) | B-2-1 | B-2-1 | B-2-1 | B-2-1 | B-2-1 | B-2-1 |
| | content of alkoxysilyl group-containing vinylic monomer in monomer composition (%) | 50 | 50 | 50 | 50 | 50 | 50 |
| | weight average molecular weight | 10,000 | 10,000 | 10,000 | 10,000 | 10,000 | 10,000 |
| | proportion (%) of (B-2) non-volatiles content relative to non-volatiles content of (B-1) + (B-2) | 50 | 50 | 50 | 50 | 50 | 50 |
| assessment results | external appearance (paint film transparency) | ○ | ○ | ○ | ○ | ○ | ○ |
| | carwash scratch resistance | ○ | ◎ | ◎ | ○ | ○ | ○ |
| | stain resistance | ○ | ○ | ○ | ○ | ○ | ○ |
| | acid resistance | ○ | ○ | ○ | ○ | ○ | ○ |
| | gasoline resistance | ○ | ○ | ○ | ○ | ○ | ○ |

| | | practical example | | | | |
|---|---|---|---|---|---|---|
| | | 19 | 20 | 21 | 22 | 23 |
| clear coat paint name | | CC-19 | CC-20 | CC-21 | CC-22 | CC-23 |
| paint composition characteristic values and component percentages | hydroxy group-containing acrylic resin (A-1) | A-1-1 | A-1-1 | A-1-1 | A-1-1 | A-1-13 |
| | resin hydroxyl number (mgKOH/g) | 120 | 120 | 120 | 120 | 120 |
| | 4-hydroxybutyl acrylate-derived resin hydroxyl number (mgKOH/g) | 120 | 120 | 120 | 120 | 60 |
| | resin design glass transition temperature (° C.) | 0 | 0 | 0 | 0 | 0 |
| | weight average molecular weight | 10,000 | 10,000 | 10,000 | 10,000 | 10,000 |
| | quantity of curing catalyst (A-2) added (non-volatiles content %) | 0.5 | 0.5 | 0.5 | 0.5 | 0.5 |
| | isocyanate compound (B-1) NCO/hydroxy group-containing acrylic resin (A-1) OH mole ratio | 1.0 | 1.0 | 1.0 | 1.0 | 1.0 |
| | alkoxysilyl group-containing copolymer (B-2) | B-2-4 | B-2-5 | B-2-6 | B-2-7 | B-2-1 |
| | content of alkoxysilyl group-containing vinylic monomer in monomer composition (%) | 40 | 70 | 50 | 50 | 50 |
| | weight average molecular weight | 10,000 | 10,000 | 4,000 | 17,000 | 10,000 |
| | proportion (%) of (B-2) non-volatiles content relative to non-volatiles content of (B-1) + (B-2) | 50 | 50 | 50 | 50 | 50 |
| assessment results | external appearance (paint film transparency) | ○ | ○ | ○ | ○ | ○ |
| | carwash scratch resistance | ○ | ○ | ○ | ○ | Δ |
| | stain resistance | ○ | ◎ | ○ | ◎ | ◎ |
| | acid resistance | ○ | ○ | ○ | ○ | ○ |
| | gasoline resistance | ○ | ○ | ○ | ○ | ○ |

TABLE 8

| | | comparative example | | | | | | |
|---|---|---|---|---|---|---|---|---|
| | | 1 | 2 | 3 | 4 | 5 | 6 | 7 |
| clear coat paint name | | CC-24 | CC-25 | CC-26 | CC-27 | CC-28 | CC-29 | CC-30 |
| paint composition characteristic values and component percentages | hydroxy group-containing acrylic resin (A-1) | A-1-1 | A-1-5 | A-1-6 | A-1-12 | A-1-1 | A-1-1 | A-1-11 |
| | resin hydroxyl number (mgKOH/g) | 120 | 60 | 210 | 120 | 120 | 120 | 120 |
| | 4-hydroxybutyl acrylate-derived resin hydroxyl number (mgKOH/g) | 120 | 60 | 0 | 0 | 120 | 120 | 120 |
| | resin design glass transition temperature (° C.) | 0 | 5 | 4 | 50 | 0 | 0 | 0 |

TABLE 8-continued

| | | comparative example | | | | | | |
|---|---|---|---|---|---|---|---|---|
| | | 1 | 2 | 3 | 4 | 5 | 6 | 7 |
| | weight average molecular weight | 10,000 | 10,000 | 10,000 | 10,000 | 10,000 | 10,000 | 26,000 |
| | quantity of curing catalyst (A-2) added (non-volatiles content %) | 0.0 | 0.5 | 0.5 | 0.5 | 0.5 | 0.5 | 0.5 |
| | isocyanate compound (B-1) NCO/hydroxy group-containing acrylic resin (A-1) OH mole ratio | 1.0 | 1.0 | 1.0 | 1.0 | 1.0 | 1.0 | 1.0 |
| | alkoxysilyl group-containing copolymer (B-2) | B-2-1 | B-2-1 | B-2-1 | B-2-1 | B-2-2 | B-2-3 | B-2-1 |
| | content of alkoxysilyl group-containing vinylic monomer in monomer composition (%) | 50 | 50 | 50 | 50 | 20 | 90 | 50 |
| | weight average molecular weight | 10,000 | 10,000 | 10,000 | 10,000 | 10,000 | 10,000 | 10,000 |
| | proportion (%) of (B-2) non-volatiles content relative to non-volatiles content of (B-1) + (B-2) | 50 | 50 | 50 | 50 | 50 | 50 | 50 |
| assessment results | external appearance (paint film transparency) | ◯ | ◯ | X | ◯ | ◯ | X | X |
| | carwash scratch resistance | X X | X | ◯ | X X | ◯ | ◯ | ◯ |
| | stain resistance | X | X | ◯ | ◯ | X X | ◯ | ◯ |
| | acid resistance | X | Δ | ◯ | ◯ | ◯ | ◯ | ◯ |
| | gasoline resistance | X | Δ | ◯ | ◯ | ◯ | ◯ | ◯ |

Practical examples 1 to 23 of the present invention showed excellent scratch resistance, stain resistance, acid resistance and gasoline resistance, with no paint film transparency problems such as clouding due to poor compatibility. With comparative examples 1 to 7, it was not possible to pass all the tests.

The invention claimed is:

1. A two-component paint composition, comprising (A) a base resin and (B) a curing agent,
wherein,
the base resin (A) comprises a hydroxy group-containing acrylic resin (A-1) and a curing catalyst (A-2);
the curing agent (B) comprises an isocyanate compound (B-1) and an alkoxysilyl group-containing copolymer (B-2);
the hydroxy group-containing acrylic resin (A-1) has a hydroxyl value of 80 to 180 mg KOH/g, a glass transition temperature of −40 to 40° C. and a weight average molecular weight of 2,000 to 20,000 g/mol; and
the alkoxysilyl group-containing copolymer (B-2) is a copolymer obtained by copolymerizing 30 to 80 parts by weight of a vinylic monomer comprising alkoxysilyl groups and 20 to 70 parts by weight of other copolymerizable monomers, its weight average molecular weight is 2,000 to 20,000 g/mol, and it does not contain hydroxy groups, carboxyl groups amino groups which react with isocyanate groups.

2. The two-component paint composition as claimed in claim 1, wherein the hydroxy group-containing acrylic resin (A-1) is a hydroxy group-containing acrylic resin derived from 4-hydroxybutyl (meth)acrylate and having a hydroxyl value of 80 to 160 mg KOH/g.

3. The two-component paint composition as claimed in claim 1, which is mixed such that the isocyanate groups of the isocyanate compound (B-1) are in a proportion of 0.5 to 1.5 equivalents per equivalent of hydroxy groups in the hydroxyl group-containing acrylic resin (A-1).

4. The two-component paint composition as claimed in claim 1, wherein in the curing agent (B), non-volatiles content of the alkoxysilyl group-containing copolymer (B-2) is in a proportion of 20 to 80 parts by weight per 100 parts by weight of combined non-volatiles contents of the isocyanate compound (B-1) and the alkoxysilyl group-containing copolymer (B-2).

5. A method for forming multilayer paint films, the method comprising:
applying an intermediate coat paint onto an electro-coated steel plate;
wet-on-wet applying a base coat paint;
wet-on-wet applying the two-component paint composition of claim 1; and
performing simultaneous thermal curing to obtain a multilayer paint film.

6. A method for forming multilayer paint films, the method comprising;
applying intermediate coat paint onto an electro-coated steel plate;
wet-on-wet applying base coat paint; then
wet-on-wet applying a clear paint composition;
performing thermal curing; then
applying the two-component paint composition of claim 1; and
performing thermal curing to obtain a multilayer paint film.

* * * * *

UNITED STATES PATENT AND TRADEMARK OFFICE
CERTIFICATE OF CORRECTION

| | | |
|---|---|---|
| PATENT NO. | : 10,190,016 B2 | Page 1 of 1 |
| APPLICATION NO. | : 15/324227 | |
| DATED | : January 29, 2019 | |
| INVENTOR(S) | : Takeshi Tsunoda | |

It is certified that error appears in the above-identified patent and that said Letters Patent is hereby corrected as shown below:

On the Title Page

In Column 2, item (57), Abstract, Line 11, delete "Scratch" and insert -- scratch --, therefor.

In Column 2, item (57), Abstract, Lines 18-19, delete "Compound" and insert -- compound --, therefor.

In the Claims

In Column 21, Line 30, Claim 1, delete "wherein," and insert -- wherein: --, therefor.

In Column 22, Line 43, Claim 6, delete "comprising;" and insert -- comprising: --, therefor.

In Column 22, Line 44, Claim 6, after "applying" insert -- an --.

In Column 22, Line 46, Claim 6, after "applying" insert -- a --.

Signed and Sealed this
Fifth Day of May, 2020

Andrei Iancu
*Director of the United States Patent and Trademark Office*